E. A. GEHRKE.
FILTERING FAUCET.
APPLICATION FILED FEB. 3, 1914.

1,116,689.

Patented Nov. 10, 1914.

WITNESSES
Jas. K. McCathran
H. F. Riley

Edward A. Gehrke,
INVENTOR

BY
E. G. Siggers
ATTORNEY

UNITED STATES PATENT OFFICE.

EDWARD A. GEHRKE, OF LINCOLN, NEBRASKA.

FILTERING-FAUCET.

1,116,689.

Specification of Letters Patent. Patented Nov. 10, 1914.

Application filed February 3, 1914. Serial No. 816,255.

*To all whom it may concern:*

Be it known that I, EDWARD A. GEHRKE, a citizen of the United States, residing at Lincoln, in the county of Lancaster and State of Nebraska, have invented a new and useful Filtering-Faucet, of which the following is a specification.

The invention relates to improvements in filtering faucets.

The object of the present invention is to improve the construction of filtering faucets, and to provide a simple, strong and durable construction designed for use on various styles of cocks and faucets, and equipped with a filtering device adapted to strain the water and prevent sand, gravel and other sediment from passing through the valve and roughening the latter and causing the faucet to leak.

A further object of the invention is to provide a non-splashing and non-hammering faucet of this character having a trap for catching the strained sediment, and capable of enabling such accumulation to be readily removed without dismounting the valve mechanism.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
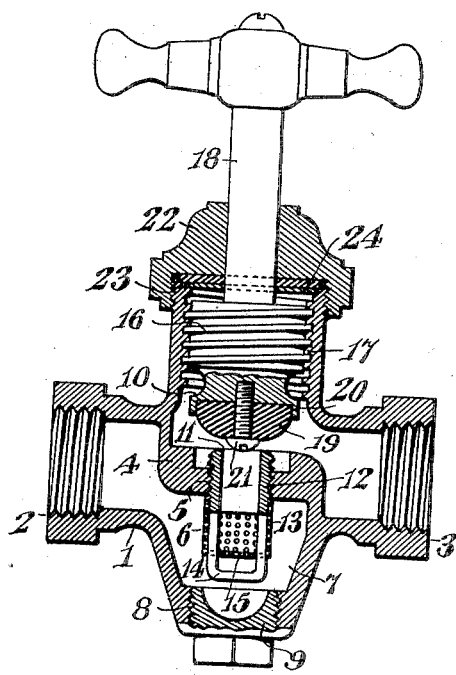
Figure 4:
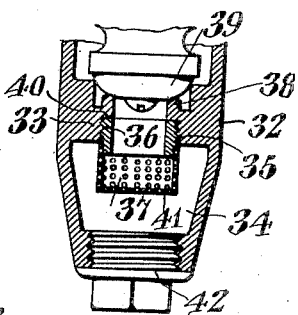
Figure 3:
Figure 2:
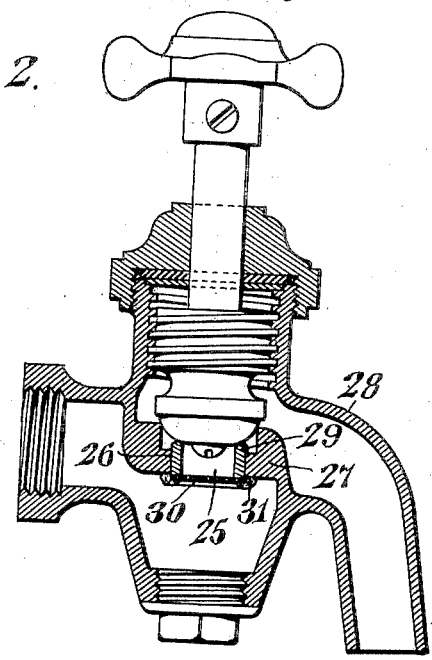

In the drawing:—Figure 1 is a central longitudinal sectional view of a self filtering line cock, constructed in accordance with this invention. Fig. 2 is a similar view of a self filtering faucet, illustrating another form of filtering device. Fig. 3 is a detail perspective view of the filtering device shown in Fig. 1. Fig. 4 is a sectional view of a portion of a filtering faucet, illustrating another arrangement of filtering device.

Like numerals of reference designate corresponding parts in all the figures of the drawing.

In the accompanying drawing in which is illustrated the preferred embodiment of the invention, 1 designates a line cock casing, but the improvement is applicable to various styles of cocks and faucets. The casing 1 is provided at a point intermediate of its inlet and outlet ends 2 and 3 with the usual partition 4 having a central threaded opening 5 for the reception of a straining device 6. The threaded opening 5 is formed in a horizontal portion of the partition of the casing 1, and the latter is provided below the straining device with a depending tubular extension 7 forming a catch basin and provided at the bottom with a threaded opening 8 for the reception of a screw plug 9 or other suitable closure, adapted to be removed to permit accumulation of mud, sand and other sediment to be readily removed without detaching or dismounting either the straining device 6 or the valve 10. The straining device, which is located at the pressure side of the valve, is adapted to prevent sand, mud and other sediment from reaching the valve 10 and its seat 11, which remain in smooth and proper condition a longer time than would be possible were the said sediment permitted to flow past the valve. The durability of cocks and faucets is thereby greatly increased.

The straining device 6, which is substantially cylindrical, consists of an upper exteriorly imperforate threaded portion 12, and a lower foraminous straining portion 13, having a depending bail or handle 14. The upper threaded portion 12 of the straining or filtering device extends through the threaded opening 5 of the partition 4 and projects at the upper face of the same, and its upper edge forms the valve seat 11. The handle or bail, which is substantially U-shaped, is composed of spaced sides and a connecting bottom portion, located below and spaced from the lower foraminous straining portion 13 of the filtering device. The sides of the handle or bail are straight and extend through the bottom 15 of the lower foraminous portion 13, and are connected at their upper ends with the upper imperforate portion 12 at the lower edge thereof and they serve to support the lower foraminous portion, which is preferably constructed of relatively thin material while the threaded upper portion is made of heavier material. While this construction provides a strong and durable filtering device adapted to be readily placed in and removed from the threaded opening of the partition and capable also of adjustment to provide an adjustable valve seat, the straining device may, however, be secured to the partition in various other ways.

The valve 10, which has a threaded portion 16 to engage interior screw threads of a neck portion 17 of the casing 1, is provided with a stem 18 of the ordinary construction, and it is preferably equipped with a rounded rubber gasket 19 to coöperate with the valve seat 11. The half round rubber gasket is secured in a recess 20 of the valve by an ordinary bib screw 21. The stem of the valve 18, which is provided with a suitable handle, extends through an interiorly threaded cap 22, which engages exterior screw threads 23 of the neck 16, a suitable packing 24 being interposed between the upper edges of the neck and the cap.

In Fig. 2 of the drawing is illustrated a filtering faucet having a straining or filtering device 25, extending through a smooth opening 26 of a partition 27 of the faucet casing 28. The straining or filtering device, which is substantially cylindrical, consists of a short sleeve or tube having projecting upper edges to form a valve seat 29 and provided at the bottom with a piece or sheet 30 of foraminous material and preferably secured in the opening of the partition by solder 31. The straining or filtering device may also be formed integral with the casing if desired.

In Fig. 4 of the drawing is illustrated another form of invention in which the casing 32 is provided with a partition 33, located above a catch basin or trap 34 and provided with an opening counterbored and threaded at the lower portion at 35 to receive an upper threaded portion 36 of a straining or filtering device 37. The partition is provided at the upper portion of the opening with a projecting valve seat 38 to coöperate with a valve 39, constructed similar to that heretofore described. The straining and filtering device, which is screwed into the lower threaded portion of the opening of the partition, fits against the shoulder 40 formed by the counterbore and is provided with a lower foraminous portion 41, which depends from the partition 33. The catch basin or trap 34 is provided with a removable screw plug 42 to permit any accumulation of sediment to be readily removed.

The filtering or straining device and the rounded gasket or washer coöperate in producing a non-splashing and non-hammering cock or faucet. Also the removable screw plug affords ready access to the straining device and will enable the latter to be easily and quickly removed and replaced by a new straining device when necessary.

What is claimed is:—

1. A filtering cock or faucet comprising a casing provided with a depending tubular catch basin or trap having an opening, a removable closure for the said opening, a partition arranged within the casing above the catch basin or trap and provided with an opening, a valve operating at the upper side of the partition, and a straining device removable through the opening in the bottom of the catch basin or trap and including an imperforate cylindrical portion secured in the opening in the partition, and a strainer connected to the lower end of the said cylindrical portion and carried by the same.

2. A filtering cock or faucet including a casing provided with a depending tubular catch basin or trap having a removable closure, a partition arranged within the casing above the catch basin or trap and provided with an opening, said partition having an annular recess surrounding the opening, an imperforate cylindrical valve seat extending through the opening in the partition and projecting at the upper side thereof and surrounded by the said recess, a strainer connected with the lower end of the cylindrical valve, and a valve operating above the partition and movable toward and from the valve seat.

3. A filtering cock or faucet comprising a casing provided with a depending tubular catch basin or trap having a removable closure, a partition arranged in the casing above the catch basin or trap and provided with an opening, a combined filtering and straining device consisting of an upper imperforate tubular portion adjustably mounted in the opening of the partition and projecting at the upper side of the latter to form a valve seat, and a lower cylindrical strainer portion depending below the partition and arranged in spaced relation with the bottom of the catch basin, and a valve operating at the upper side of the partition and movable into and out of engagement with the valve seat.

4. A filtering cock or faucet comprising a casing having a partition provided with an opening, a combined filtering and straining device consisting of an imperforate portion mounted in the opening and projecting from one side of the partition to form a valve seat, a handle having spaced side portions connected at its sides to the said imperforate portion, and a cylindrical straining portion supported by the sides of the handle and located at the opposite side of the partition from the valve seat, and a valve coöperating with the valve seat.

In testimony, that I claim the foregoing as my own, I have hereto affixed my signature in the presence of two witnesses.

EDWARD A. GEHRKE.

Witnesses:
W. C. FRAMPTON,
W. A. DIEHL.